United States Patent
Lin (10) Patent No.: US 10,023,257 B2
(45) Date of Patent: Jul. 17, 2018

(54) WATERPROOF END CAP FOR BICYCLE FRAME MEMBER

(71) Applicant: Chi-Yi Lin, Taichung (TW)

(72) Inventor: Chi-Yi Lin, Taichung (TW)

( * ) Notice: Subject to any disclaimer, the term of this patent is extended or adjusted under 35 U.S.C. 154(b) by 0 days.

(21) Appl. No.: 15/386,088

(22) Filed: Dec. 21, 2016

(65) Prior Publication Data

US 2018/0170471 A1   Jun. 21, 2018

(51) Int. Cl.
| | | |
|---|---|---|
| *F16B 37/14* | (2006.01) | |
| *B62J 23/00* | (2006.01) | |
| *F16B 39/284* | (2006.01) | |
| *B62K 19/00* | (2006.01) | |

(52) U.S. Cl.
CPC .............. *B62J 23/00* (2013.01); *F16B 37/14* (2013.01); *F16B 39/284* (2013.01); *B62K 19/00* (2013.01)

(58) Field of Classification Search
CPC .......... B62J 23/00; F16B 37/14; F16B 39/284
USPC .............. 411/372.6; 292/246, DIG. 11, 175; 138/89; 280/179, 180
See application file for complete search history.

(56) References Cited

U.S. PATENT DOCUMENTS

| | | | | | |
|---|---|---|---|---|---|
| 1,830,949 | A * | 11/1931 | Lake | ............... | B65D 90/626 220/315 |
| 2,352,728 | A * | 7/1944 | Merker | ............... | B65D 39/082 285/317 |
| 4,341,436 | A * | 7/1982 | Kanno | ............... | G02B 23/16 220/326 |
| 4,500,008 | A * | 2/1985 | Cook | ............... | H01R 13/5213 220/242 |
| 4,600,278 | A * | 7/1986 | Saito | ............... | G03B 11/06 220/326 |
| 5,472,108 | A * | 12/1995 | Skudlarek | ............... | B60K 15/04 220/281 |
| 6,325,240 | B1 * | 12/2001 | Gruber | ............... | B60K 15/0406 220/326 |
| 6,641,343 | B1 * | 11/2003 | Duran | ............... | F16B 19/109 411/348 |
| 7,556,169 | B2 * | 7/2009 | Cooper | ............... | B65D 43/166 220/326 |
| 8,104,801 | B2 * | 1/2012 | Wang | ............... | H01M 2/1044 215/295 |
| 2003/0034628 | A1 * | 2/2003 | Chien | ............... | B62K 21/06 280/280 |

(Continued)

*Primary Examiner* — Gary W Estremsky
(74) *Attorney, Agent, or Firm* — Alan D. Kamrath; Kamrath IP Lawfirm, P.A.

(57) ABSTRACT

A waterproof end cap for covering and closing an end hole of a bicycle head tube includes a threaded locking base, a locking member, and a sealing cover. The threaded locking base is engaged in the end hole. The locking member has large- and small-diameter portions. The end of the large-diameter portion that faces away from the small-diameter portion has an outwardly extending annular plate. The small-diameter portion is externally threaded, extends into the end hole, and threadedly connects with the threaded hole of the threaded locking to base such that the annular plate is pulled to cover the end hole. The sealing cover is larger than the annular plate in diameter and has opposite first and second sides. The first side is free of water-holding spaces. The second side covers the annular plate detachably through elastic engagement. Water can neither accumulate on nor leak through the sealing cover.

8 Claims, 11 Drawing Sheets

(56) References Cited

U.S. PATENT DOCUMENTS

2005/0161463 A1\* 7/2005 Litchman ............... B65D 59/02
                                                    220/787
2006/0055146 A1\* 3/2006 Ueno .................... B62K 21/06
                                                    280/280

\* cited by examiner

WATERPROOF END CAP FOR BICYCLE FRAME MEMBER

BACKGROUND OF THE INVENTION

Technical Field

The present invention relates to a bicycle component and, more particularly, to a waterproof end cap for covering and closing an end hole of the head tube of a bicycle.

Description of Related Art

Figure 9:
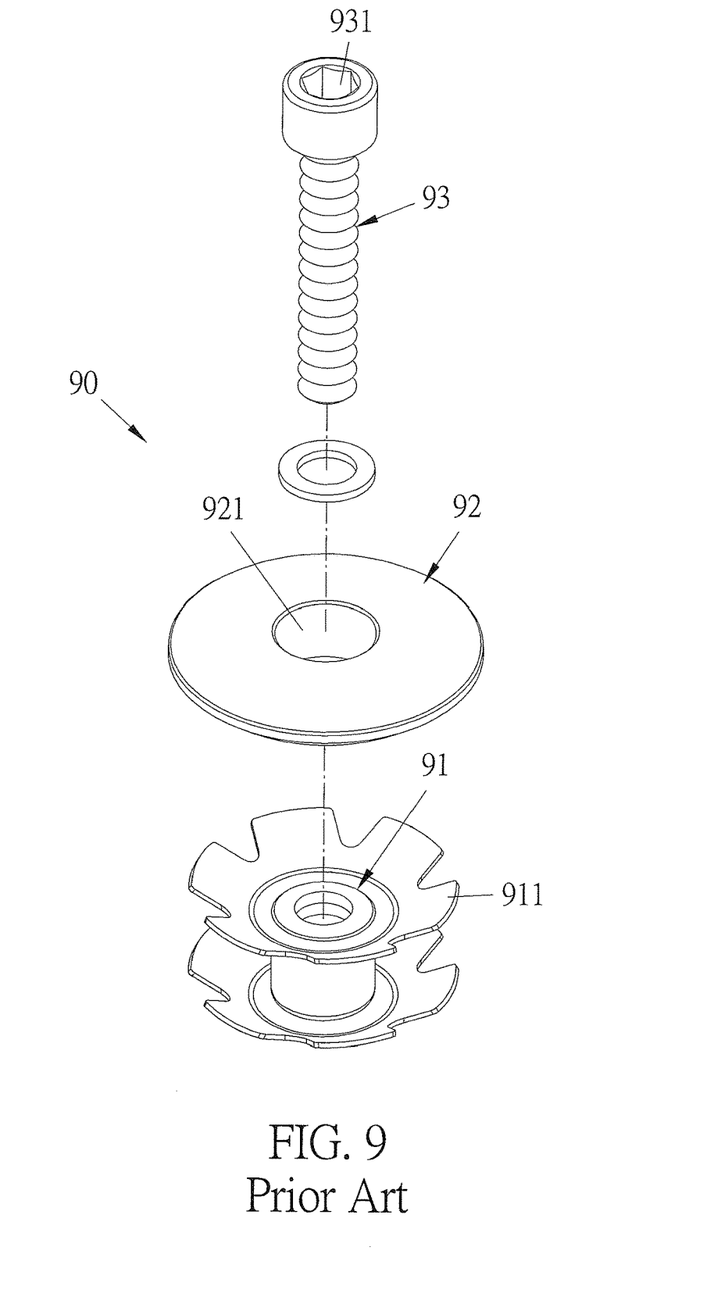
FIG. 9 is an exploded perspective view of a conventional end cap.
Figure 10:
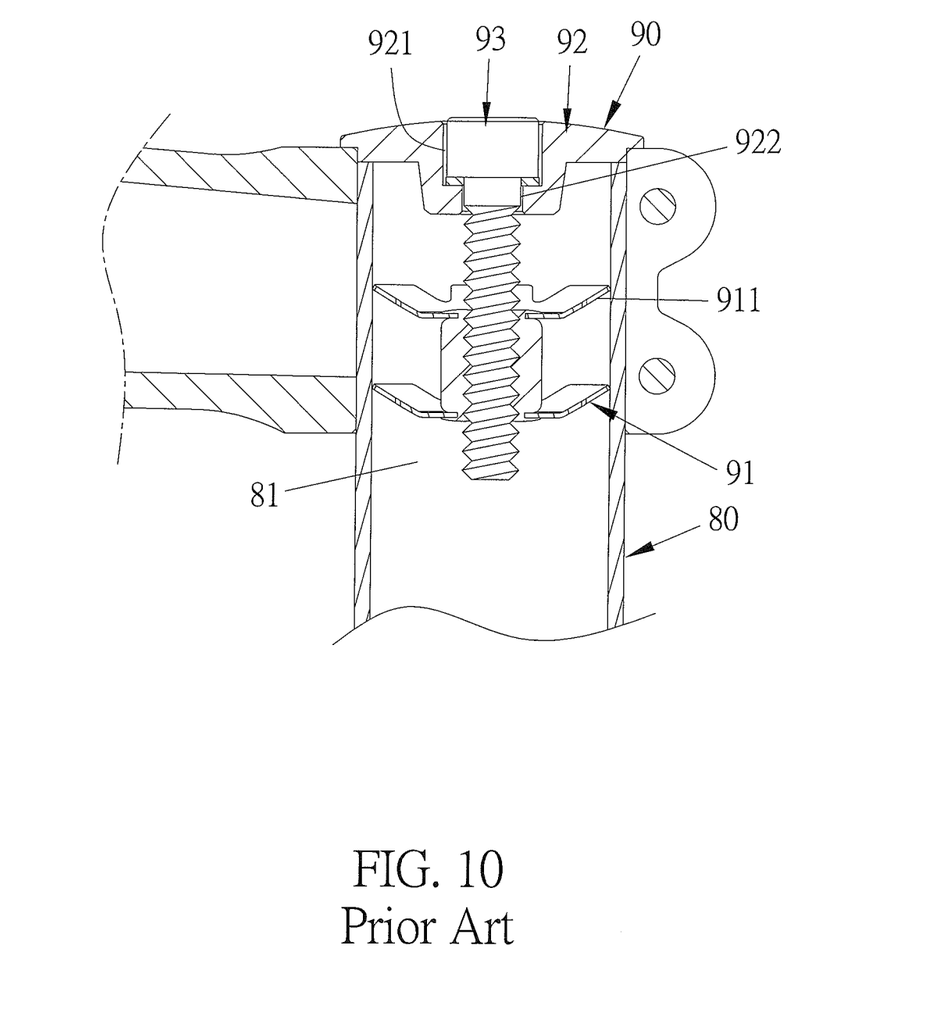
FIG. 10 is a sectional view showing a conventional end cap mounted in a head tube.
Figure 11:
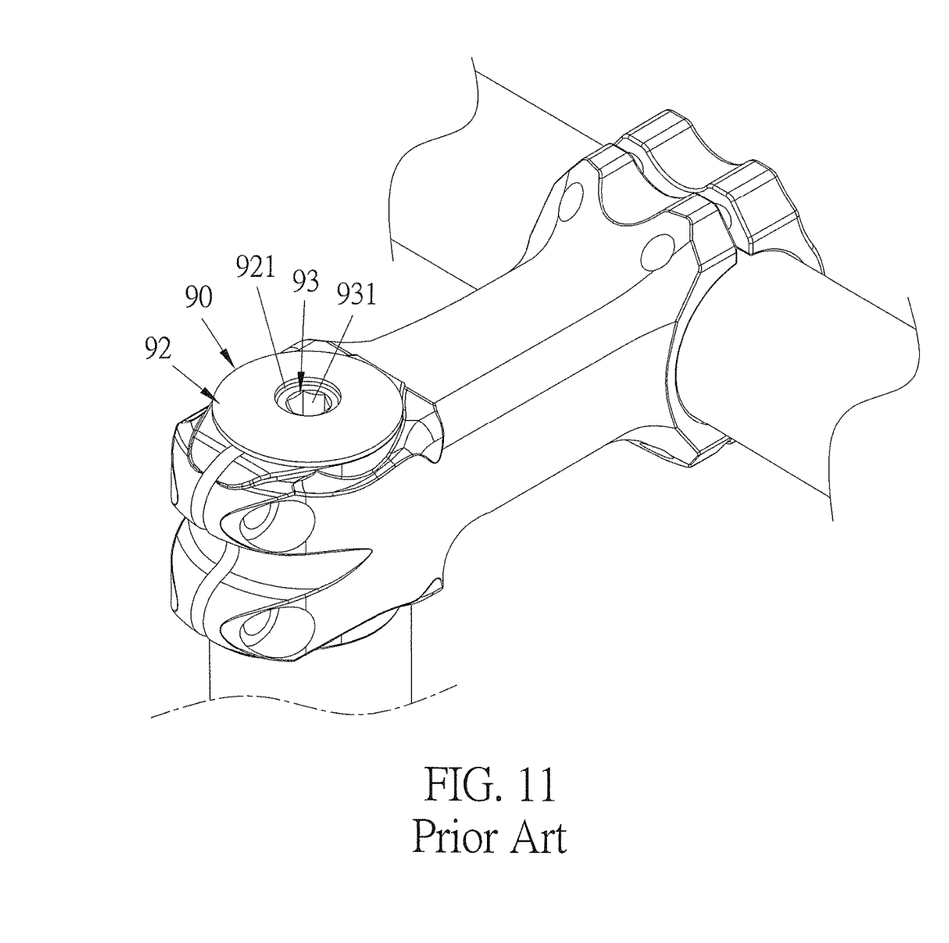
FIG. 11 is a perspective view showing a conventional end cap mounted in a head tube.

Typically, the head tube of a bicycle (i.e., the tube whose upper end is connected with the handlebars and whose lower end is connected with the bicycle fork) has its upper end hole covered and closed with an end cap. As shown in FIG. 9, FIG. 10, and FIG. 11, the end cap 90 for covering the upper end hole 81 of the head tube 80 essentially includes a threaded locking base 91, a cover 92, and a bolt 93. The threaded locking base 91 is fitted in the upper, end hole 81, with its peripheral engaging plates 911 engaged with the inner wall of the head tube 80 to secure the threaded locking base 91 at a predetermined position in the head tube 80. The cover 92 is concavely provided with a bolt head receiving space 921 at the center, is penetrated by a bolt hole 922, and sits on the rim of the upper end hole 81 of the head tube 80. The bolt 93 has a socket head with a driving groove 931, extends through the bolt head receiving space 921, and is threadedly connected in the bolt hole 922. Thus, the cover 92 covers and closes the upper end hole 81 of the head tube 80.

However, water tends to accumulate in the bolt head receiving space 921 of the end cap 90 and the driving groove 931 of the socket head of the bolt 93 while the upper end hole 81 of the head tube 80 is covered and closed with the end cap 90. Water may also leak through the gaps between the bolt 93, the wall of the bolt, head receiving space 921 and the wall of the bolt hole 922 of the cover 92. Should water accumulate and leak persistently, the bolt 93 and the interior of the head tube 80 are bound to rust, thus shortening the service lives of the bolt 93 and the head tube 80. The end cap 90, therefore, demands improvement.

BRIEF SUMMARY OF THE INVENTION

In view of the fact that the conventional end cap of a bicycle head tube may lead to water accumulation and leakage and thus curtail the service lives of the bolt in the end cap and the head tube itself, the present invention redesigns such end caps.

The present invention provides a waterproof end cap for a bicycle frame member. More particularly, the end cap is configured for covering and closing an end hole of the head tube of a bicycle. The head tube is connected with handlebars and a bicycle fork. The end cap includes a threaded locking base, a locking member, and a sealing cover. The threaded locking base is centrally provided with a threaded hole and is peripherally provided with a plurality of engaging plates that extend outward. The threaded locking base is received in the end hole of the head tube, and the engaging plates of the threaded locking base are engaged with the inner wall of the head tube and are thus secured in position. The locking member has a large-diameter portion and a small-diameter portion. The large-diameter portion has one end facing away from the small-diameter portion, is provided with an outwardly extending annular plate, and has an end face centrally and concavely provided with a receiving cavity. The peripheral wall of the receiving cavity is provided with an engaging groove. The small-diameter portion is peripherally provided with an external thread and is centrally provided with a through hole that communicates with the receiving cavity of the large-diameter portion. The small-diameter portion extends into the end hole of the head tube, and the external thread of the small-diameter portion is threadedly connected with the threaded hole of the threaded locking base. The annular plate of the large-diameter portion is pulled by the small-diameter portion to cover the end hole of the head tube. The sealing cover has a diameter greater than the outer diameter of the annular plate of the locking member and has a first side and a second side facing away from the first side. The first side is free of any water-holding space. The second side covers the annular plate of the locking member and is provided with a mounting portion. The mounting portion is formed with a slide groove that opens outward. The slide groove is mounted therein with a press switch that can only be slid linearly within a predetermined range. An elastic member is provided between the press switch and the slide groove and pushes the press switch outward elastically. The press switch has an outer side provided with a first engaging block and a pressing plate. The mounting portion is provided with a second engaging block on a side facing away from the first engaging block. The mounting portion is mounted in the receiving cavity of the locking member, with the first engaging block and the second engaging block engaged in the engaging groove of the peripheral wall of the receiving cavity of the locking member to prevent the sealing cover from separating from the locking member.

The primary objective of the present invention is to ensure that the sealing cover does not have any water-holding space or gap and hence will not result in water accumulation or leakage. This technical feature protects the locking member and the interior of the head tube from rusting so that the service lives of the locking member and the head tube may be extended.

Another objective of the present invention is to ensure that the sealing cover can be detached from the locking member as easily as it can be fixed to and thereby cover the locking member. This technical feature allows the end cap to be used flexibly.

DETAILED DESCRIPTION OF THE INVENTION

The present invention provides a waterproof end cap for a bicycle frame member. Referring to FIG. 1 through FIG. 7, the end cap 1 is configured to cover and close an end hole 2A of the head tube 2 of a bicycle. The head tube 2 is connected with a bicycle fork and handlebars 3. The handlebars 3 are connected to the head tube 2 via a handlebar stem 4. The end of the handlebar stem 4 that is connected to the head tube 2 has a longitudinal slit 4A. The end cap 1 includes a threaded locking base 10, a locking member 20, and a sealing cover 30.

Figure 1:
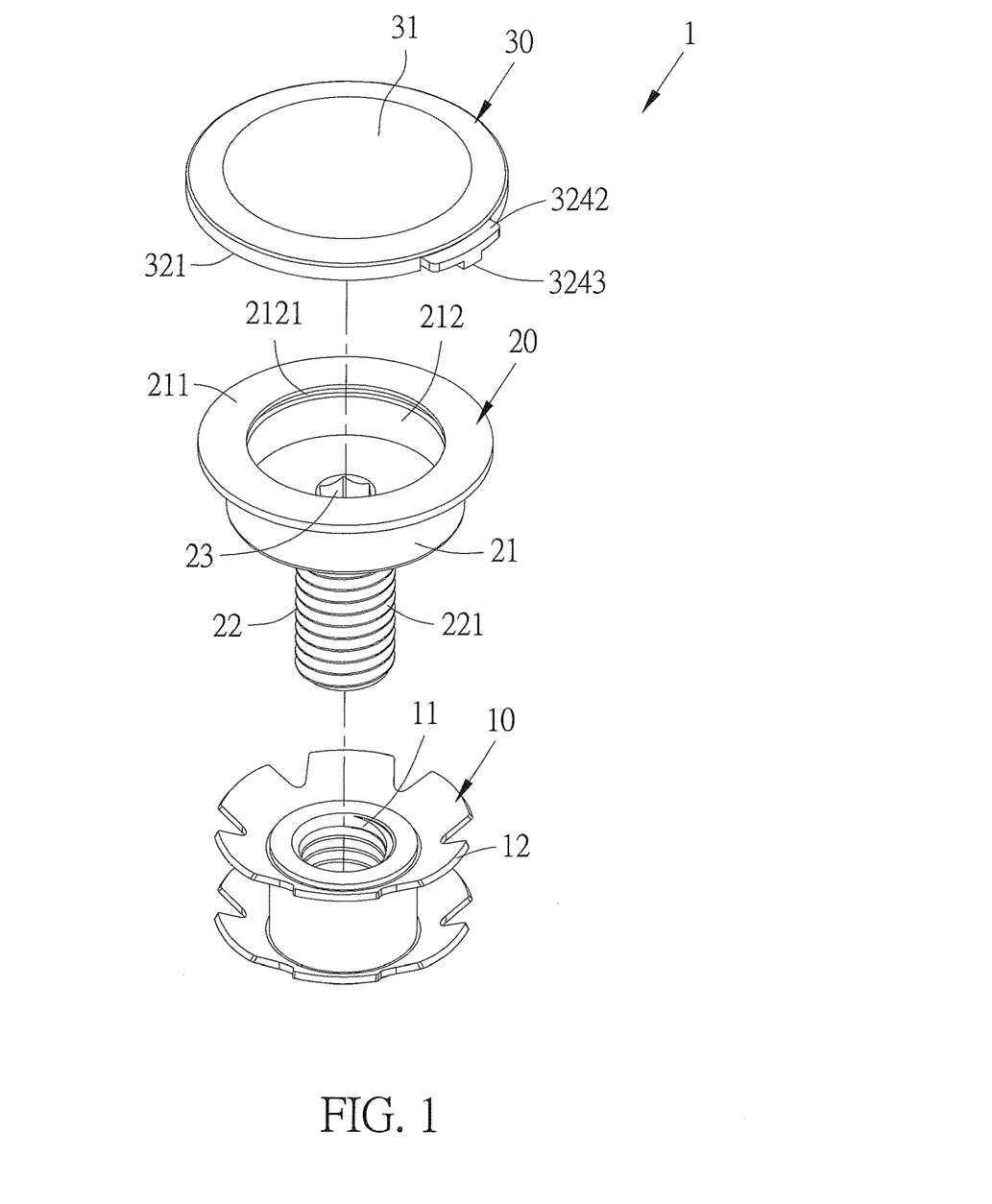
FIG. 1 is an exploded perspective view of the present invention.
Figure 2:
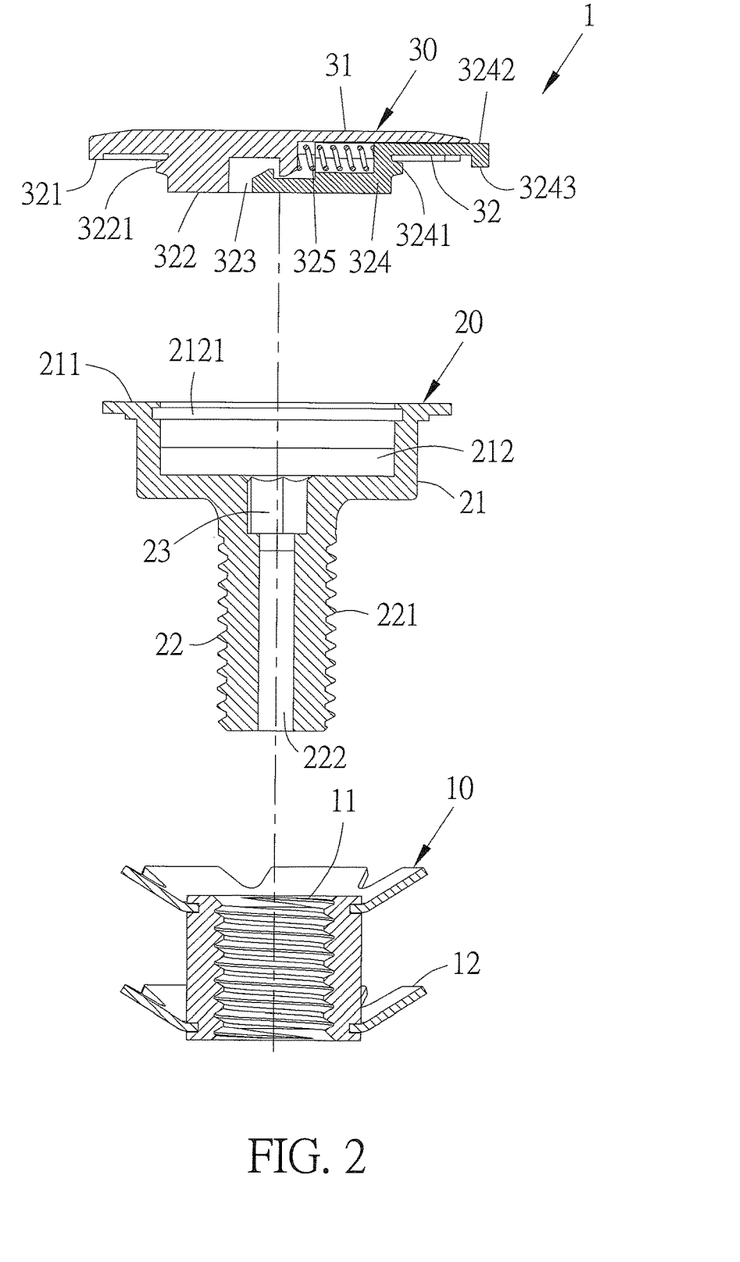
FIG. 2 is an exploded sectional view of the present invention.

The threaded locking base 10 is provided with a threaded hole 11 at the center and is peripherally provided with a plurality of engaging plates 12 that extend outward. The threaded locking base 10 is received in the end hole 2A of the head tube 2 in such a way that the engaging plates 12 of the threaded locking base 10 are engaged with the inner wall of the head tube 2 and are thereby fixed in position.

Figure 3:
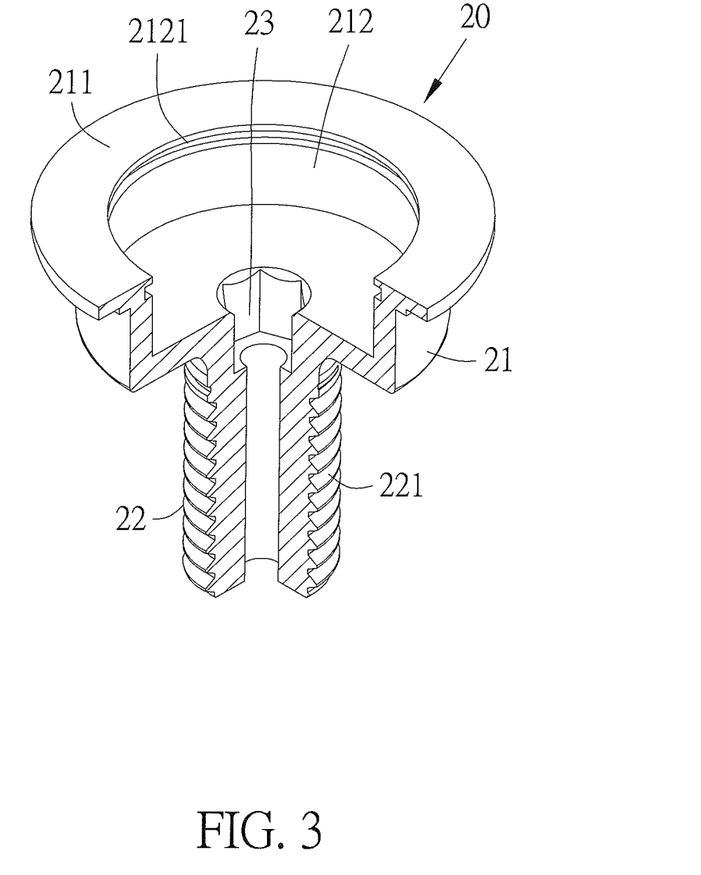
FIG. 3 is a sectional perspective view of the locking member in the present invention.

The locking member 20 has a large-diameter portion 21 and a small-diameter portion 22. The end of the large-diameter portion 21 that faces away from the small-diameter portion 22 is provided with an annular plate 211 that extends outward. The end of the large-diameter portion 21 that faces away from the small-diameter portion 22 also has an end face concavely provided with a receiving cavity 212 at the center. The peripheral wall of the receiving cavity 212 is provided with an engaging groove 2121. The small-diameter portion 22 is peripherally provided with an external thread 221. In addition, the small-diameter portion 22 is provided with a through hole 222 at the center, and the through hole 222 is in communication with the receiving cavity 212. A driving groove 23 is provided between the receiving cavity 212 of the large-diameter portion 21 and the through hole 222 of the small-diameter portion 22. The small-diameter portion 22 extends into the end hole 2A of the head tube 2. The external thread 221 of the small-diameter portion 22 is threadedly connected with the threaded hole 11 of the threaded locking base 10. The annular plate 211 of the large-diameter portion 21 is pulled by the small-diameter portion 22 to cover the end hole 2A of the head tube 2.

Figure 4:
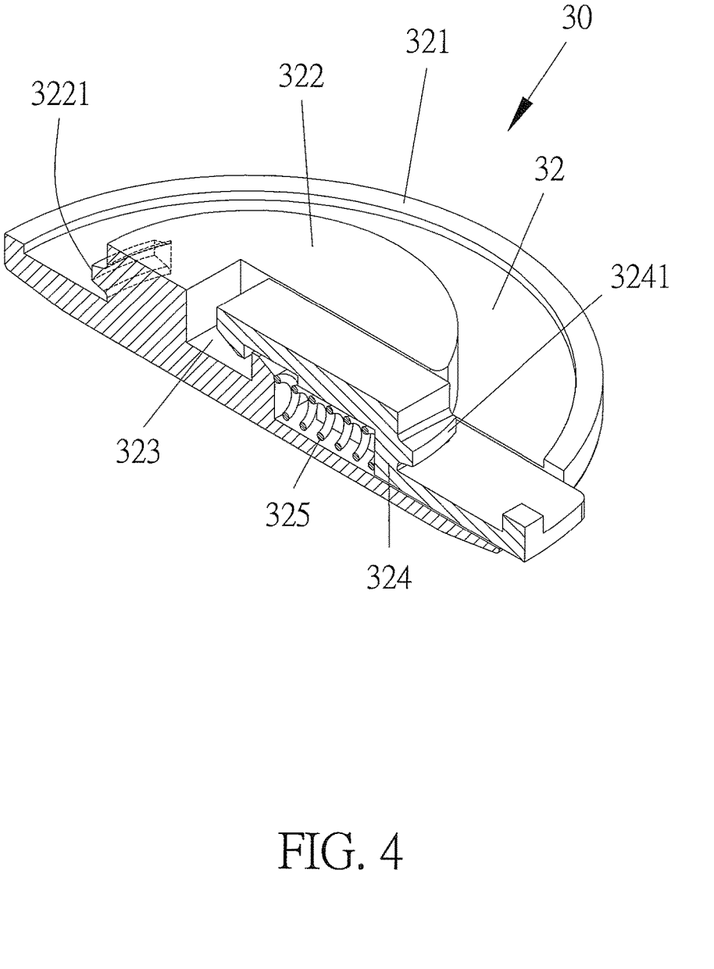
FIG. 4 is a sectional perspective view of the sealing cover in the present invention.

The sealing cover 30, with a diameter greater than the outer diameter of the annular plate 211 of the locking member 20, has a first side 31 and a second side 32 facing away from the first side 31. The first side 31 is free of any water-holding space and is a completely flat surface, on which a trademark, pattern, or text may be provided. The second side 32 is, peripherally and protrudingly provided with a wall 321 and covers the annular plate 211 of the locking member 20 in such a way that the wall 321 covers the periphery of the annular plate 211 of the locking member 20. The second side 32 is also provided with a protruding mounting portion 322. The mounting portion 322 is formed with a slide groove 323 that opens outward. A press switch 324 is mounted in the slide groove 323 and can only be slid linearly within a predetermined range. Moreover, an elastic member 325 capable of elastic extension and contraction (implemented m this embodiment as a spring) is provided between the press switch 324 and the slide groove 323 and pushes the press switch 324 outward elastically. The press switch 324 has an outer side provided with a first engaging block 3241 and a pressing plate 3242 protruding beyond the sealing cover 30. The mounting portion 322 is provided with a second engaging block 3221 on a side facing away from the first engaging block 3241. The mounting portion 322 is mounted in the receiving cavity 212 of the locking member 20. The first engaging block 3241 and the second engaging block 3221 are engaged in the engaging groove 2121 of the peripheral wall of the receiving cavity 212 of the locking member 20, such that the sealing cover 30 cannot be separated from the locking member 20. Besides, the pressing plate 3242 is provided with a protruding positioning portion 3243 configured to fit precisely into the slit 4A of the handlebar stem 4. With the protruding positioning portion 3243 fitted in the slit 4A of the handlebar stem 4, the sealing cover 30 is limited in position and prevented from rotation.

Figure 5:
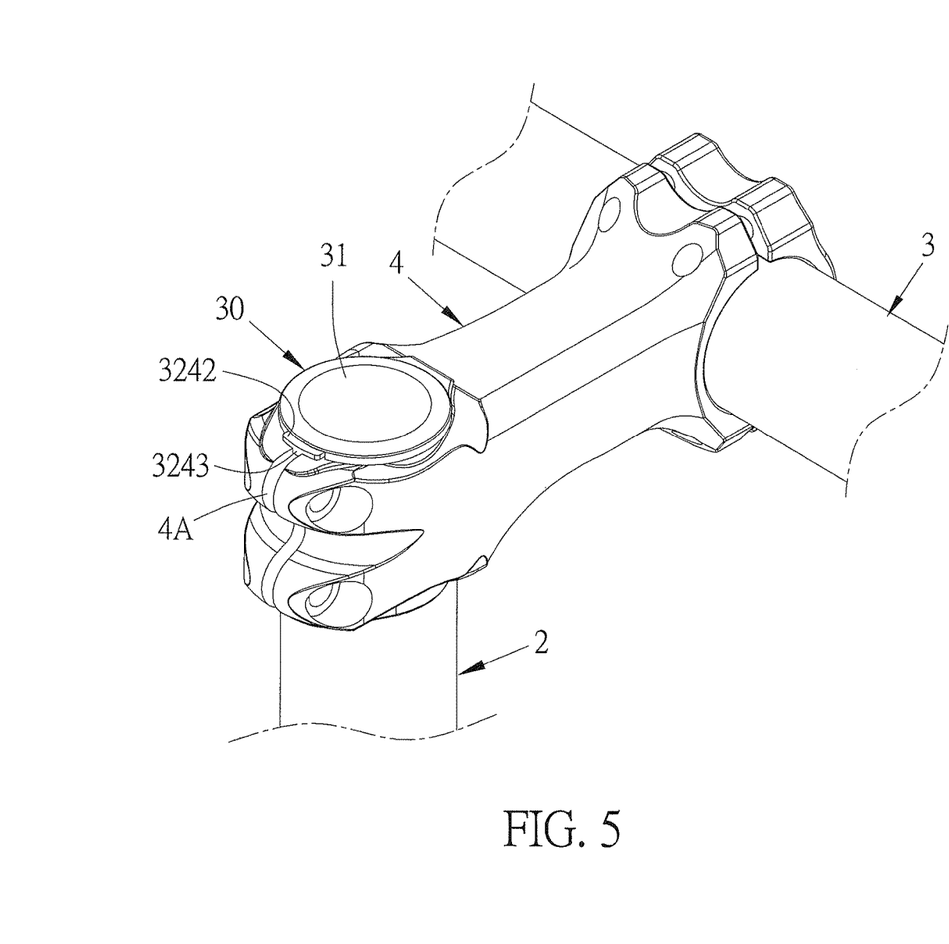
FIG. 5 is a perspective view showing the present invention mounted in a head tube.
Figure 6:
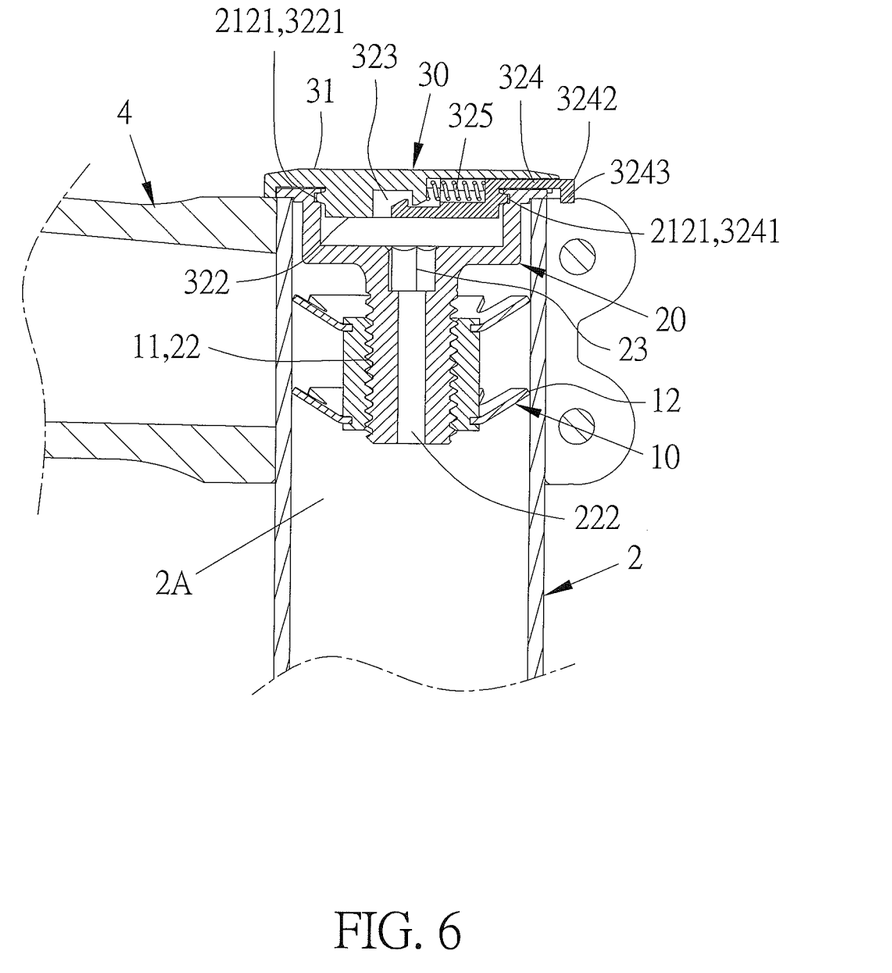
FIG. 6 is a sectional view showing the present invention mounted in a head tube.

To assemble the waterproof end cap of the present invention, the threaded locking base 10 is placed into the end hole 2A of the head tube 2 and the engaging plates 12 are engaged with the inner wall of the head tube 2 and secured in place. Then, the small-diameter portion 22 of the locking member 20 is inserted into the end hole 2A of the head tube 2, and the driving groove 23 is driven with a tool to bring the external thread 221 of the small-diameter portion 22 into threaded connection with the threaded hole 11 of the threaded locking base 10. As a result, the annular plate 211 of the large-diameter portion 21 of the locking member 20 is pulled by the small-diameter portion 22 and ends up covering the end hole 2A of the head tube 2. Following that, the annular plate 211 of the locking member 20 is covered with the second side 32 of the sealing cover 30, and the pressing plate 3242 of the sealing cover 30 is pressed so that not only are the first engaging block 3241 and the second engaging block 3221 engaged in the engaging groove 2121 of the peripheral wall of the receiving cavity 212 of the locking member 20, but also the protruding positioning portion 3243 is fitted in the slit 4A of the handlebar stem 4, thanks to the elasticity of the elastic member 325. The assembly process is thus completed.

Figure 7:
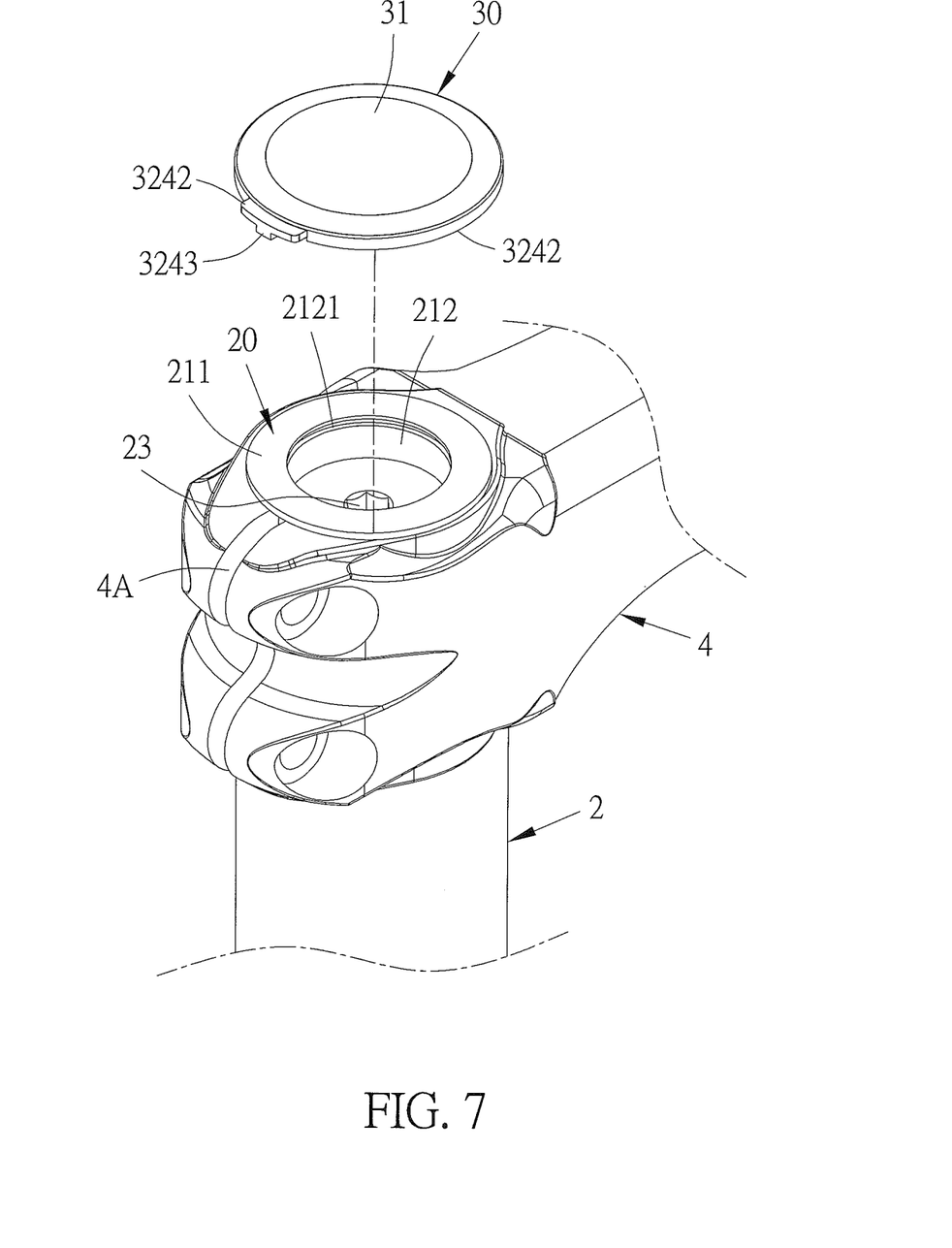
FIG. 7 is another perspective view showing the present invention mounted in a head tube, with the sealing cover out of its covering position.
Figure 8:
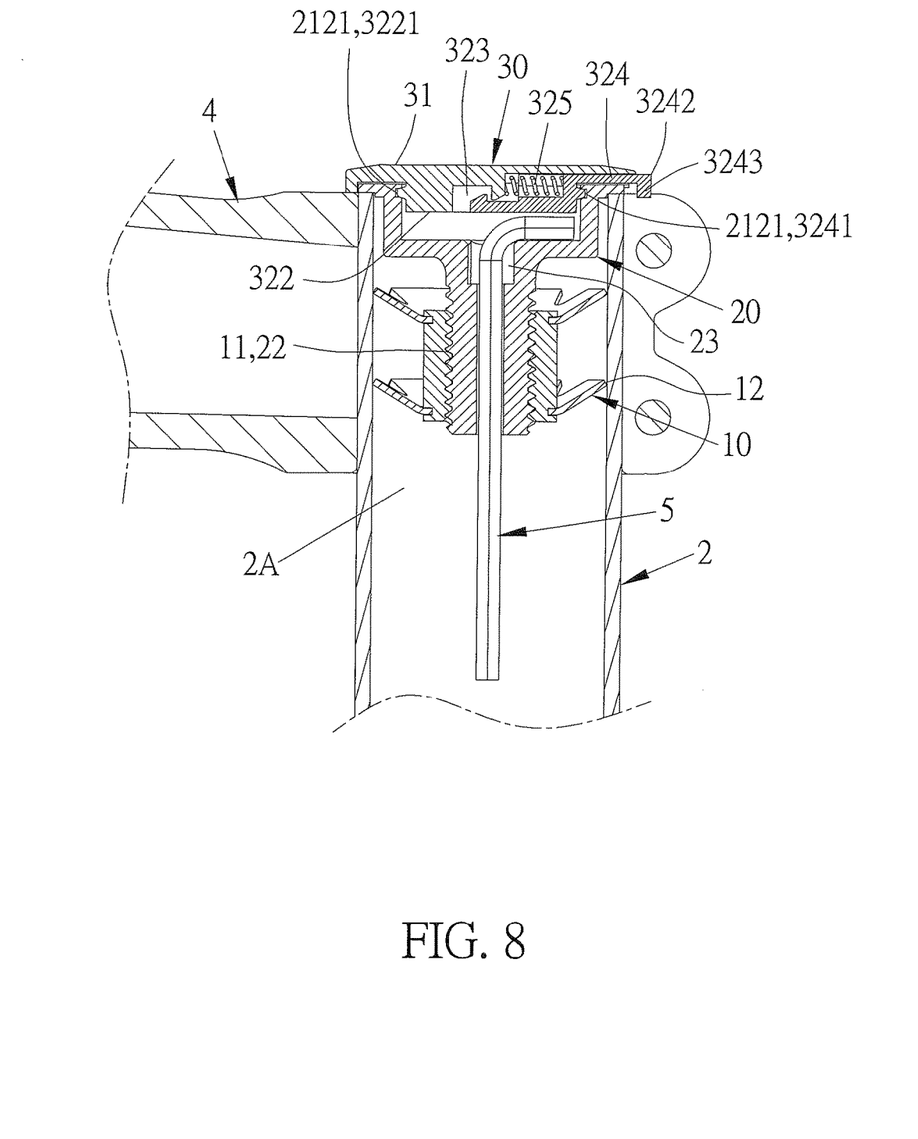
FIG. 8 is another sectional view showing the present invention mounted in a head tube, with a tool received in the present invention.

After assembly, the pressing plate 3242 of the sealing cover 30 can be pressed again to compress the elastic member 325 and thereby disengage the first engaging block 3241 from the engaging groove 2121 of the peripheral wall of the receiving cavity 212 of the locking member 20, allowing the sealing cover 30 to be lifted and separated from the locking member 20. Then, referring to FIG. 8, a tool 5 (implemented in this embodiment as a hex key) can be placed into and eventually received in the receiving cavity 212, the driving groove 23, and the through hole 222 of the locking member 20, in order to be carried along with the bicycle for easy access when needed.

The structure of the embodiment described above has the following advantageous effects:

1. The sealing cover 30 for covering the locking member 20 and sealing the end hole 2A of the head tube 2 is free of water-holding spaces or gaps and therefore will not collect water or have water leakage problems.

The locking member 20 and the interior of the head tube 2 are thus protected from rusting, and the service lives of the locking member 20 and the head tube 2 may be extended as a result.

2. The sealing cover 30 can be detached from the locking member 20 as easily as it can be fixed to and thereby cover the locking member 20, allowing the receiving cavity 212, the driving groove 23, and the through hole 222 of the locking member 20 to be used flexibly.

According to the above, the innovative structure disclosed herein does provide an improvement over the prior art, is industrially applicable, involves an inventive step.

What is claimed is:

1. A waterproof end cap for a bicycle frame member, wherein the end cap is configured to cover and close an end hole of a head tube of a bicycle, and wherein the head tube is connected with handlebars and a bicycle fork, with the end cap comprising:

a threaded locking base centrally provided with a threaded hole and peripherally provided with a plurality of outwardly extending engaging plates, with the threaded locking base received in the end hole of the head tube, wherein the engaging plates of the threaded locking base are engaged with an inner wall of the head tube and are thus secured in position;

a locking member having a large-diameter portion and a small-diameter portion, wherein the large-diameter portion has an end facing away from the small-diameter portion, is provided with an outwardly extending annular plate, and has an end face centrally and concavely provided with a receiving cavity, wherein the receiving cavity has a peripheral wall provided with an engaging groove, wherein the small-diameter portion is peripherally provided with an external thread and is centrally provided with a through hole in communication with the receiving cavity of the large-diameter portion, wherein the small-diameter portion extends into the end hole of the head tube, wherein the external thread of the small-diameter portion is threadedly connected with the threaded hole of the threaded locking base, and wherein the annular plate of the large-diameter portion is pulled by the small-diameter portion to cover the end hole of the head tube;

a sealing cover having a diameter greater than an outer diameter of the annular plate of the locking member, with the sealing cover having a first side and a second side facing away from the first side, wherein the first side is free of any water-holding space, with the second side covers the annular plate of the locking member and is provided with a mounting portion, wherein the mounting portion is formed with an outwardly opening slide groove, wherein the slide groove is mounted therein with a press switch, wherein the press switch is restricted to linear sliding movement within a predetermined range; and an elastic member between the press switch and the slide groove, wherein the elastic member pushes the press switch outward elastically, wherein the press switch has an outer side provided with a first engaging block and a pressing plate, wherein the mounting portion has a side facing away from the first engaging block and provided with a second engaging block, wherein the mounting portion is mounted in the receiving cavity of the locking member, and wherein the first engaging block and the second engaging block are engaged in the engaging groove of the peripheral wall of the receiving cavity of the locking member to prevent the sealing cover from separating from the locking member.

2. The waterproof end cap of claim 1, wherein the locking member is provided with a driving groove between the receiving cavity of the large-diameter portion and the through hole of the small-diameter portion.

3. The waterproof end cap of claim 1, wherein the first side of the sealing cover is a completely flat surface.

4. The waterproof end cap of claim 1, wherein the second side of the sealing cover is peripherally and protrudingly provided with a wall, and wherein the wall covers a periphery of the annular plate of the locking member.

5. The waterproof end cap of claim 1, wherein the elastic member of the sealing cover is a spring.

6. The waterproof end cap of claim 1, wherein the pressing plate of the sealing cover protrudes beyond the sealing cover.

7. The waterproof end cap of claim 1, wherein the head tube and the handlebars are connected by a handlebar stem, wherein the handlebar stem has an end connected to the head tube and formed with a longitudinal slit, and wherein the sealing cover is provided with a protruding positioning portion fitted in the slit of the handlebar stem to prevent the sealing cover from rotation.

8. The waterproof end cap of claim 7, wherein the protruding positioning portion of the sealing cover is provided on the pressing plate of the sealing cover.

* * * * *